(12) United States Patent
Klein et al.

(10) Patent No.: US 6,804,592 B2
(45) Date of Patent: Oct. 12, 2004

(54) FOUR WHEEL STEERING COMPENSATION FOR LOW COEFFICIENT OF FRICTION SURFACE

(75) Inventors: Steven Donald Klein, Munger, MI (US); Scott M. Wendling, Montrose, MI (US); Paul A. Grougan, Novi, MI (US); Scott P Sherman, Fenton, MI (US); Eugene A Rodden, Gilbert, AZ (US); Roderick L Lemmer, Birmingham, MI (US)

(73) Assignees: Delphi Technologies, Inc., Troy, MI (US); General Motors Corporation, Detroit, MI (US)

( * ) Notice: Subject to any disclaimer, the term of this patent is extended or adjusted under 35 U.S.C. 154(b) by 0 days.

(21) Appl. No.: 09/982,217

(22) Filed: Oct. 18, 2001

(65) Prior Publication Data

US 2003/0078711 A1 Apr. 24, 2003

(51) Int. Cl.[7] .......................... B62D 6/04; G01M 15/00
(52) U.S. Cl. ...................... 701/41; 701/48; 701/65; 701/73; 701/74; 180/411
(58) Field of Search .......................... 701/41, 42, 48, 701/65, 72, 73, 74; 180/410, 411, 413, 445

(56) References Cited

U.S. PATENT DOCUMENTS

| 4,740,002 A | | 4/1988 | Miyoshi ..................... 180/415 |
| 4,939,653 A | | 7/1990 | Tsurumiya et al. .... 364/424.05 |
| 5,225,983 A | | 7/1993 | Ohmura et al. ........ 364/424.05 |
| 5,576,957 A | | 11/1996 | Asanuma et al. ...... 364/424.05 |
| 5,615,117 A | | 3/1997 | Serizawa ............. 364/424.052 |
| 5,869,753 A | | 2/1999 | Asanuma et al. .......... 73/117.3 |
| 5,890,082 A | * | 3/1999 | Ikegaya et al. ............... 701/41 |
| 5,954,774 A | * | 9/1999 | Jung et al. .................... 701/41 |

* cited by examiner

Primary Examiner—Thomas G. Black
Assistant Examiner—Arthur D. Donnelly
(74) Attorney, Agent, or Firm—Michael D. Smith

(57) ABSTRACT

A method directed to improving the stability of a motor vehicle having front and rear steering capabilities includes determining a coefficient of friction of the road surface with which the motor vehicle is engaged and adjusting a phase gain function of a rear steering mechanism to compensate for the steerability of the motor vehicle over the road surface. A system for improving the stability of a motor vehicle having front and rear steering capabilities includes a control unit, a front steering mechanism in informational communication with the control unit, and a rear steering mechanism in informational communication with the control unit. The rear steering mechanism is responsive through the control unit to road conditions of the road surface.

11 Claims, 2 Drawing Sheets

FOUR WHEEL STEERING COMPENSATION FOR LOW COEFFICIENT OF FRICTION SURFACE

BACKGROUND

Motor vehicles having four-wheel steering systems are typically defined by a set of front wheels that are steerable in unison with each other and a set of rear wheels that are likewise steerable in unison with each other. The control of the direction and angle of the steering movement of the rear steerable wheels is independent of the control of an operator of the motor vehicle and dependent upon the speed of travel of the motor vehicle. When steering the motor vehicle at low speeds, the rear wheels are generally steered out-of-phase or in the opposite direction of the front wheels, thereby enabling the motor vehicle to articulate turns of a small radius. When steering the motor vehicle at high speeds, the rear wheels are generally steered in-phase or in the same direction of the front wheels in order to impart increased stability to the motor vehicle during high speed maneuvering such as lane changes.

SUMMARY

A method and a system for improving the stability of a motor vehicle having front and rear steering capability is described herein. The method includes determining a coefficient of friction of a road surface with which the motor vehicle is engaged and adjusting a phase gain function of a rear steering mechanism to compensate for the steerability of the motor vehicle over the road surface. The system includes a control unit, a front steering mechanism in informational communication with the control unit, and a rear steering mechanism in informational communication with the control unit. The rear steering mechanism is responsive through the control unit to road conditions of the road surface with which the motor vehicle is engaged.

DETAILED DESCRIPTION

Figure 1:
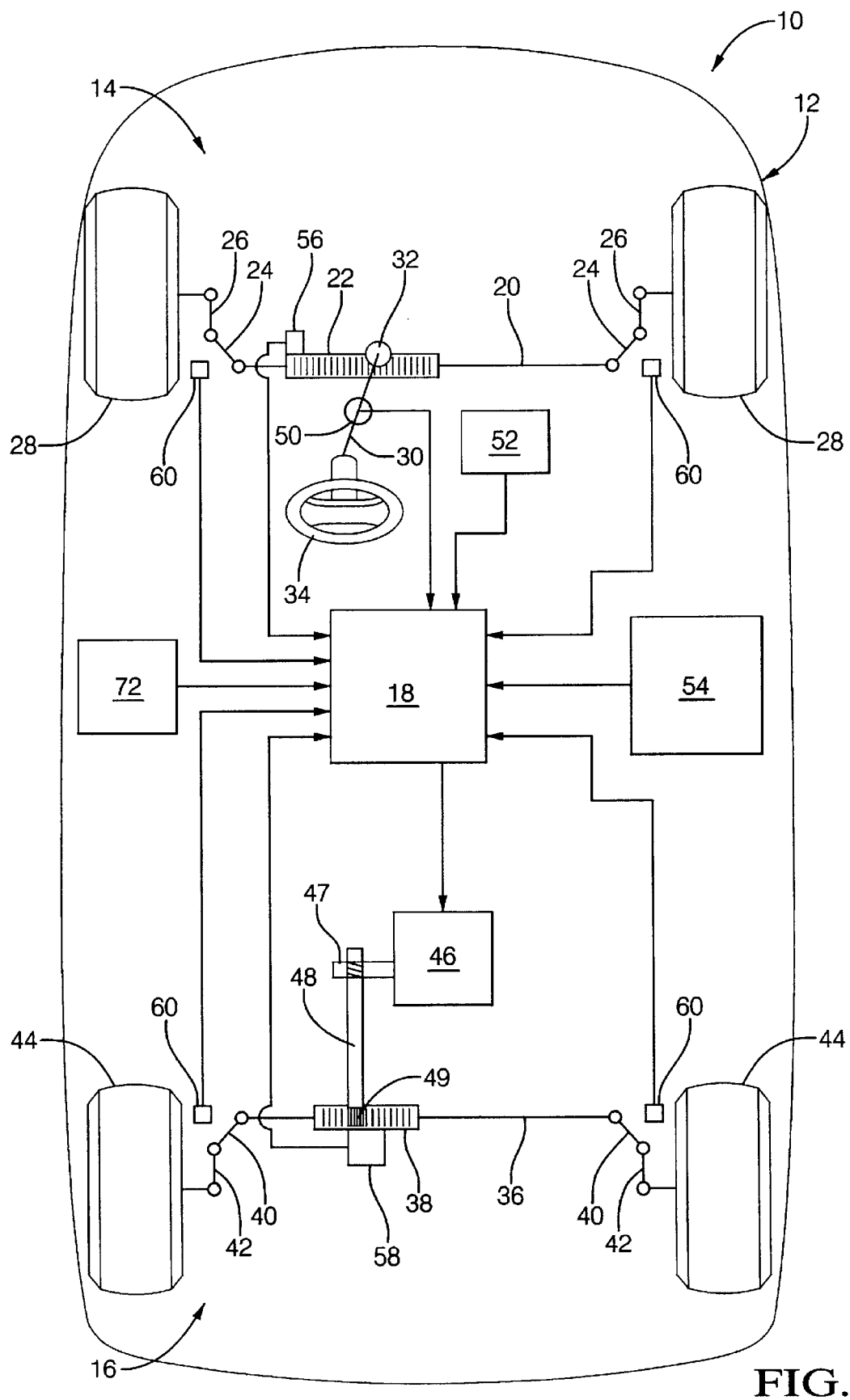
FIG. 1 is a schematic representation of a motor vehicle having an anti-lock braking system and front and rear steerable wheels.

Referring now to FIG. 1, a steering system is shown generally at 10 and is hereinafter referred to as "system 10." System 10 is a incorporable into a motor vehicle 12 to provide directional control to motor vehicle 12 and is configurable to enable motor vehicle 12 to adapt to limit handling conditions caused by understeering and oversteering. System 10 comprises a front steering mechanism, shown generally at 14, a rear steering mechanism, shown generally at 16, and a control unit 18 disposed in intermediate and informational communication with front steering mechanism 14 and rear steering mechanism 16. Although system 10 is described as being applicable to a rack and pinion steering arrangement, system 10 can be incorporable into other steering arrangements including, but not being limited to, integral gear steering systems.

Front steering mechanism 14 comprises a rack shaft 20, a rack 22 disposed intermediate opposing ends of rack shaft 20, a tie rod 24 disposed on each opposing end of rack shaft 20, a knuckle arm 26 connected to each tie rod 24, and a front steerable wheel 28 rotatably disposed on each knuckle arm 26. Rack shaft 20, tie rods 24, and knuckle arms 26 are configured such that front steerable wheels 28 can be angled in unison relative to a body of motor vehicle 12 to steer or to effect a change in the direction of travel of motor vehicle 12 while motor vehicle 12 is moving.

Front steering mechanism 14 further comprises a mechanism through which an operator of can effectuate a desired change in the direction of travel of motor vehicle 12. Such a mechanism comprises a steering column 30 disposed in operable communication at one end thereof with rack 22 through a pinion 32 and at an opposing end thereof with a steering device 34. Steering device 34 may be a hand steering wheel. Manipulation of steering device 34, e.g., rotation of the hand steering wheel, causes the axial rotation of steering column 30, which in turn causes the rotation of pinion 32. Rotation of pinion 32, through the engagement of rack 22 and pinion 32, effectuates the lateral translation of rack 22 relative to the body of motor vehicle 12. The lateral translation of rack 22 causes front steerable wheels 28 to angle relative to the body of motor vehicle 12, thereby altering the direction of travel of motor vehicle 12 while motor vehicle 12 is moving.

Rear steering mechanism 16 comprises a rack shaft 36, a rack 38 disposed intermediate opposing ends of rack shaft 36, a tie rod 40 disposed on each opposing end of rack shaft 36, a knuckle arm 42 connected to each tie rod 40, and a rear steerable wheel 44 rotatably disposed on each knuckle arm 42. Rack shaft 36, tie rods 40, and knuckle arms 42 are configured such that rear steerable wheels 44, like front steerable wheels 28, can be angled in unison relative to the body of motor vehicle 12 to steer motor vehicle 12 upon lateral translation of rack 38.

Rear steering mechanism 16 further comprises a mechanism through which rear steerable wheels 44 can be angled. Such a mechanism comprises a motor 46 operably connected to rack 38 through a drive mechanism 48. Drive mechanism 48, through a pinion 49, transfers the rotational motion of a rotor shaft 47 of motor 46 to linear motion of rack 38, which effectuates the lateral motion of rack shaft 36 and, ultimately, the angling of rear steerable wheels 44.

Motor vehicle 12 is further provided with a steering sensor 50 for detecting an angular position of steering column 30, a vehicle speed sensor 52, and a rear rack shaft displacement sensor 58. Rack shaft displacement sensor 58 detects the displacement of its corresponding rack shaft 36 from a reference position, which is the position in which each rear steerable wheel 44 is aligned and rotatable. Wheel rotation speed sensors 60 are disposed at each steerable wheel 28, 44 to detect the various angular speeds at which each steerable wheel 28, 44 rotates. The various angular speeds of steerable wheels 28, 44 are then used to apply braking pressure to each individual steerable wheel 28, 44 through a brake system, shown below with reference to FIG. 2.

Control unit 18 is disposed in informational communication with the various systems of motor vehicle 12. Control unit 18 receives informational signals from each of the systems, quantifies the received information, and provides an output response signal to rear steering mechanism 16 through motor 46. The output to rear steering mechanism 16 is such that the out-of-phase gain is altered, thereby increasing motor vehicle stability on road surfaces having low coefficients of friction. A low coefficient of friction can be inferred by the actuation of the brake system or by differences in the rates of wheel spin as determined by wheel rotation speed sensors 60.

Figure 2:
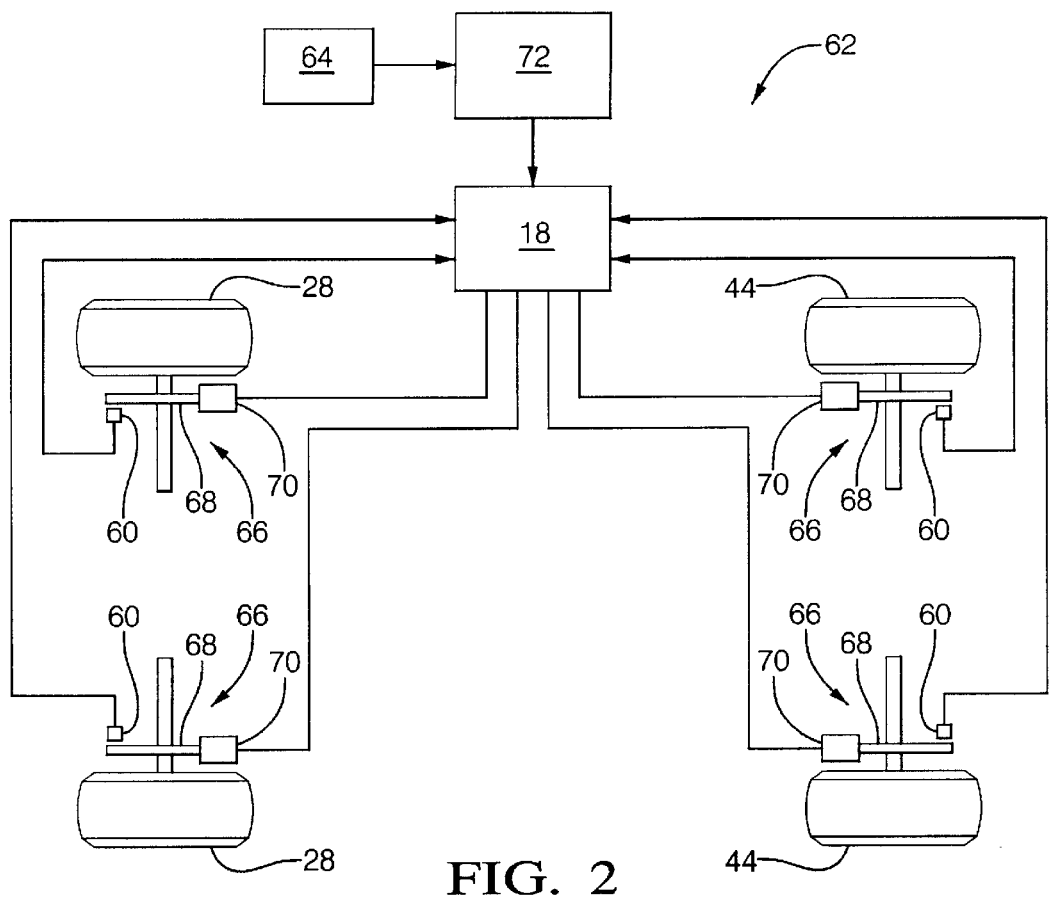
FIG. 2 is a schematic representation of an anti-lock braking system of a motor vehicle.

Referring now to FIG. 2, the brake system and its incorporation into the motor vehicle is shown generally at 62. Brake system 62 is configured to receive an input 64 from the operator of the motor vehicle through an anti-lock braking system (ABS) control unit 72 and control unit 18 and to provide an appropriate response to the motor vehicle. In brake system 62, each front steerable wheel 28 and rear steerable wheel 44 is provided with a braking device, shown generally at 66. Braking device 66 includes a rotor 68 disposed in a co-rotational relationship with its respective steerable wheel 28, 44 and an associated caliper 70. Upon an application of hydraulic pressure to effectuate the actuation of calipers 70, rotational motion of rotors 68 is arrested. Each individual caliper 70 can be selectively actuated by ABS control unit 72. Moreover, each individual caliper 70 can be actuated in varying degrees, thereby providing improved braking ability and increased stability to the motor vehicle in the yaw directions.

Referring back to FIG. 1, upon actuation of ABS control unit 72, the magnitude of the control signal transmitted to rear steering mechanism 16 is altered accordingly. In particular, upon actuation of ABS control unit 72, control unit 18 infers that a road surface over which motor vehicle 12 is traveling has a surface having a low coefficient of friction. Control unit 18 then reduces the magnitude of the control signal to rear steering mechanism 16 in order to reduce the low speed out-of-phase gain function of the control signal, thereby reducing the effect of yaw moments on motor vehicle 12 and increasing its stability. Upon disengagement of the brakes under ABS control unit 72, control unit 18 augments the magnitude of the control signal to rear steering mechanism 16 to restore the low speed out-of-phase gain function of the control signal to its pre-reduced state.

Alternately, control unit 18 may be configured to maintain the reduction of the magnitude of the control signal to rear steering mechanism 16 upon disengagement of the brakes under ABS control. In such an instance, motor vehicle 12 operates in an "enhanced control" mode wherein the low speed out-of-phase gain function of the control signal is maintained beyond the point at which motor vehicle 12 reacts to the limit handling condition that initially triggers operation of the directional control function provided by system 10. The operation of motor vehicle 12 in the enhanced control mode effectuated by the reduction of the magnitude of the control signal to rear steering mechanism 16 can be maintained for a specified period of time or until system 10 is re-triggered. Control unit 18 can further be configured such that operation of motor vehicle 12 in the enhanced control mode can be cancelled at the option of the operator.

System 10 may also be configured such that a road surface defined by a low coefficient of friction could be inferred from variations in the wheel rotation speeds. Excessive variations in the speeds of rotation of steerable wheels 28, 44 is indicative of the existence of a potential slip condition in which motor vehicle 12 may be subject to undesirable yaw moments. In such an instance, signals received into control unit 18 from wheel rotation speed sensors 60 are interpreted such that the magnitude of the control signal to rear steering mechanism 16 is altered in order to properly adjust the low speed out-of-phase gain function. The inference of a surface having a low coefficient of friction by the detection of excessive variations in the wheel rotation speeds may be made in conjunction with the actuation of ABS control unit 72.

Figure 3:
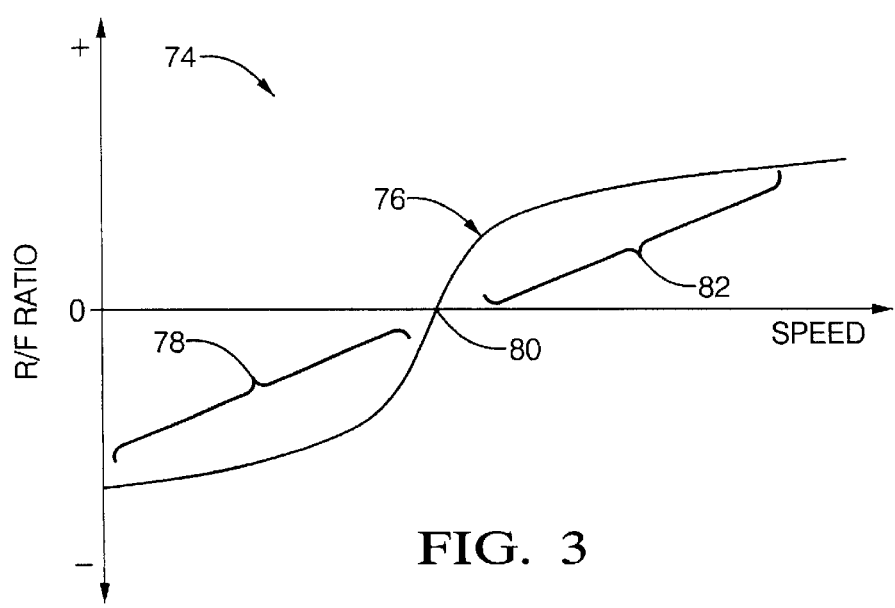
FIG. 3 is a graphical representation of the out-of-phase angle of a motor vehicle having front and rear steerable wheels as the out-of-phase angle relates to the velocity of the motor vehicle.

Referring now to FIG. 3, a graphical interpretation of the rear-to-front ratio (R/F ratio) of the steerable wheels as it relates to the velocity of the motor vehicle is shown generally at 74 and is hereinafter referred to as "graph 74." The R/F ratio is defined as the ratio of the angle of the rear wheels to the angle of the front wheels. During out-of-phase steering (in which the rear wheels are steered in a direction opposite the direction of the front wheels), the R/F ratio is negative, and during in-phase steering (in which the rear wheels are steered in the same direction as the front wheels), the R/F ratio is positive.

Graph 74 is applicable to limit handling conditions in which the motor vehicle travels over surfaces having low coefficients of friction, as are indicated by the actuation of the ABS and/or the detection of excessive wheel spin. As stated above, travel of the motor vehicle across such surfaces while being subject to high amounts of out-of-phase gain may result in conditions of reduced yaw stability. In order to combat reduced yaw stability, the magnitude of out-of-phase steering at lower velocities is decreased and the velocity at which the change from out-of-phase steering to in-phase steering occurs is correspondingly reduced. The point at which such change occurs is defined as a crossover point 80. At increasingly higher velocities, the reduced yaw stability is countered by increasing the magnitude of the in-phase gain.

In graph 74, the R/F ratio as a function of the velocity of the motor vehicle is indicated by a curve, shown generally at 76. At low velocity (on a surface of reduced friction), the out-of-phase steering gain as represented by the R/F ratio is generally large, as is shown by a portion 78 of curve 76. At crossover point 80, the R/F ratio is zero and for all angles of the front steerable wheels, the rear steerable wheels remain parallel to a longitudinal centerline of the motor vehicle. Upon operation of the motor vehicle at speeds on curve 76 beyond crossover point 80 and in an area defined by a portion 82 of curve 76, the rear steerable wheels are angled to be in-phase, and improved yaw stability is realized. By reducing the out-of-phase gain as the motor vehicle travels over a surface having a reduced coefficient of friction at low velocities, particularly over portion 78 of curve 76, the yaw stability of the motor vehicle can be improved during limit handling conditions. By increasing the amount of in-phase gain as the motor vehicle travels over a surface having a reduced coefficient of friction at higher velocities, the improved yaw stability of the motor vehicle can be further realized.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method of improving the stability of a motor vehicle having front and rear steering capability, the method comprising:

determining a coefficient of friction of a road surface with which the motor vehicle is engaged, wherein said determining of said coefficient of friction comprises sensing an actuation of a braking system of the motor vehicle; and, adjusting a phase gain function of a rear steering mechanism to compensate for steerability of the motor vehicle over said road surface.

2. The method of claim 1 wherein said actuation of said braking system is an actuation of an anti-lock braking system.

3. A method of improving the stability of a motor vehicle having front and rear steering capability, the method comprising:
   determining a coefficient of friction of a road surface with which the motor vehicle is engaged; and,
   adjusting a phase gain function of a rear steering mechanism to compensate for steerability of the motor vehicle over said road surface;
   wherein said determining of said coefficient of friction comprises:
      determining rates of spin of different wheels of the motor vehicle; and
      comparing said rates of spin of said different wheels of the motor vehicle.

4. The method of claim 1 wherein said adjusting of said phase gain function comprises:
   altering a magnitude of a control signal transmitted to said rear steering mechanism of the motor vehicle; and
   positioning said rear steering mechanism in accordance with said control signal.

5. The method of claim 4 wherein said altering of said magnitude of said control signal comprises: reducing said magnitude of said control signal upon detection of said road surface having a reduced coefficient of friction associated therewith.

6. The method of claim 4 wherein said altering of said magnitude of said control signal comprises: augmenting said magnitude of said control signal upon detection of said road surface having an increased coefficient of friction associated therewith.

7. A steering system for a motor vehicle, the system comprising:
   a control unit;
   a front steering mechanism in information communication with said control unit; and
   a rear steering mechanism in informational communication with said control unit, said rear steering mechanism being responsive through said control unit to road conditions of a road surface with which the motor vehicle is engaged;
   a braking system incorporable into the motor vehicle, said braking system being in informational communication with said control unit;
   wherein, upon an actuation of the braking system, a coefficient of friction of a road surface with which the motor vehicle is engaged is inferred in the control unit and correspondingly adjusts a magnitude of a control signal to the rear steering mechanism; and,
   wherein said rear steering mechanism is controllable in response to the signal transmitted from said control unit in response to the actuation of said braking system.

8. A steering system for a motor vehicle, the system comprising:
   a control unit;
   a front steering mechanism in information communication with said control unit; and
   a rear steering mechanism in informational communication with said control unit, said rear steering mechanism being responsive through said control unit to road conditions of a road surface with which the motor vehicle is engaged;
   wheel rotation speed sensors disposed in operable communication with respective wheels of the motor vehicle, said wheel rotation speed sensors being in informational communication with said control unit;
   wherein, upon detection and comparison of wheel rotation speeds of various wheels of the motor vehicle, a coefficient of friction of a road surface with which the motor vehicle is engaged is inferred in the control unit and correspondingly adjusts a magnitude of a control signal to the rear steering mechanism; and,
   wherein said rear steering mechanism is controllable in response to the signal transmitted from said control unit in response to the detection and comparison of wheel rotation speeds at said wheel rotation speed sensors.

9. The method of claim 3 wherein said adjusting of said phase gain function comprises:
   altering a magnitude of a control signal transmitted to said rear steering mechanism of the motor vehicle; and
   positioning said rear steering mechanism in accordance with said control signal.

10. The method of claim 9 wherein said altering of said magnitude of said control signal comprises: reducing said magnitude of said control signal upon detection of said road surface having a reduced coefficient of friction associated therewith.

11. The method of claim 9 wherein said altering of said magnitude of said control signal comprises: augmenting said magnitude of said control signal upon detection of said road surface having an increased coefficient of friction associated therewith.

\* \* \* \* \*